P. J. BODE.
FLEXIBLE HOLLOW JOINT.
APPLICATION FILED MAY 1, 1912.

1,064,283.

Patented June 10, 1913.

2 SHEETS—SHEET 1.

WITNESSES:
Harry A. Beimes.
Fannie E. Weber.

INVENTOR.
Peter J. Bode.

BY
ATTORNEY.

P. J. BODE.
FLEXIBLE HOLLOW JOINT.
APPLICATION FILED MAY 1, 1912.

1,064,283.

Patented June 10, 1913.

2 SHEETS—SHEET 2.

WITNESSES:
Harry A. Bennes.
Fannie E. Huber.

INVENTOR.
Peter J. Bode
BY
Ernst Starek
ATTORNEY.

UNITED STATES PATENT OFFICE.

PETER J. BODE, OF ST. LOUIS, MISSOURI.

FLEXIBLE HOLLOW JOINT.

1,064,283.　　　　Specification of Letters Patent.　　Patented June 10, 1913.

Application filed May 1, 1912.　Serial No. 694,569.

*To all whom it may concern:*

Be it known that I, PETER J. BODE, citizen of the United States, residing at St. Louis, State of Missouri, have invented certain new and useful Improvements in Flexible Hollow Joints, of which the following is a full, clear, and exact description, reference being had to the accompanying drawings, forming a part hereof.

My invention has relation to improvements in flexible hollow joints for pumping and similar machinery; and it consists in the novel construction of joint more fully set forth in the specification and pointed out in the claims.

Figure 1:
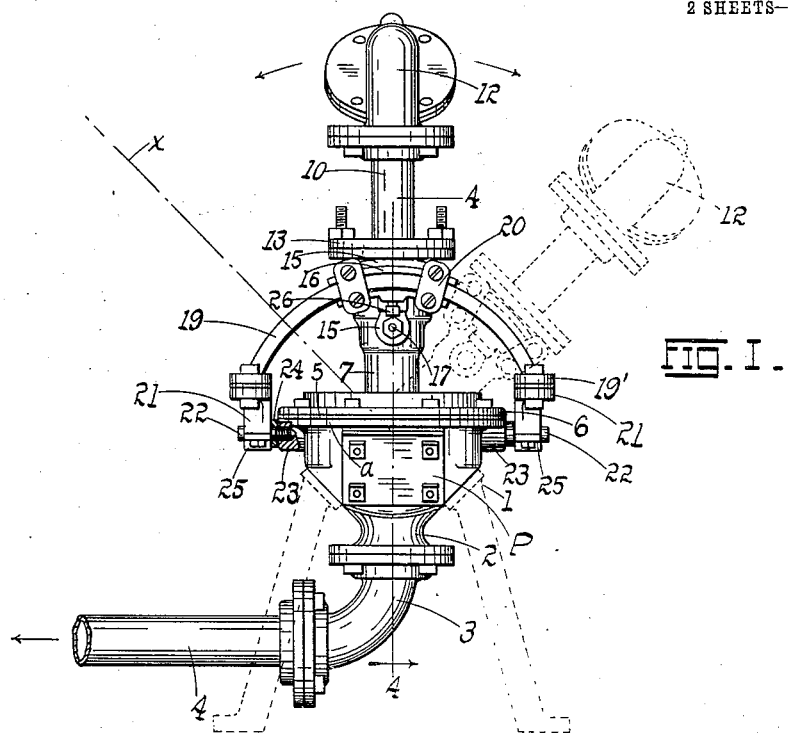
Figure 2:
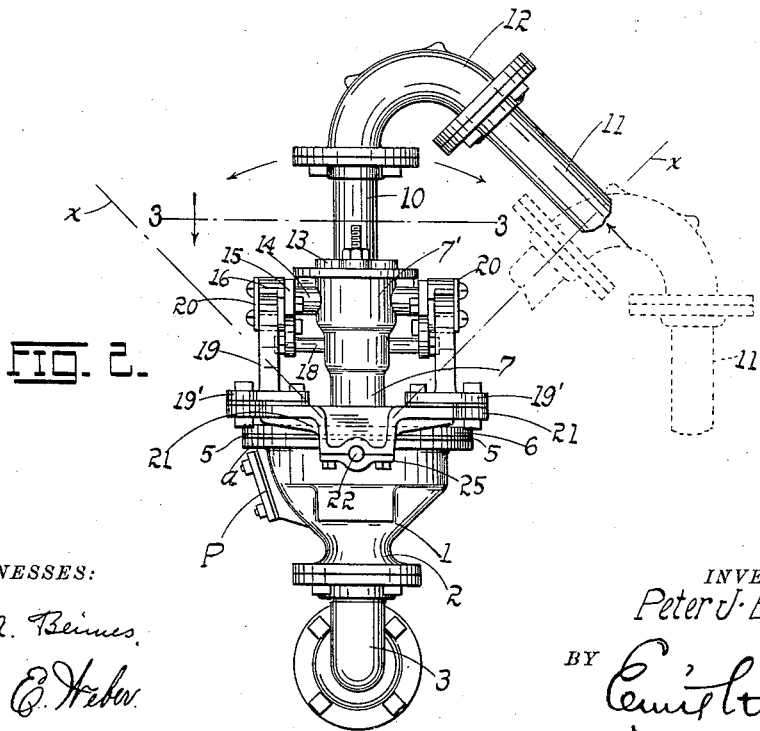
Figure 3:
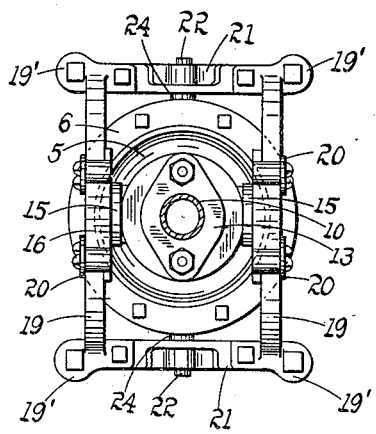
Figure 4:
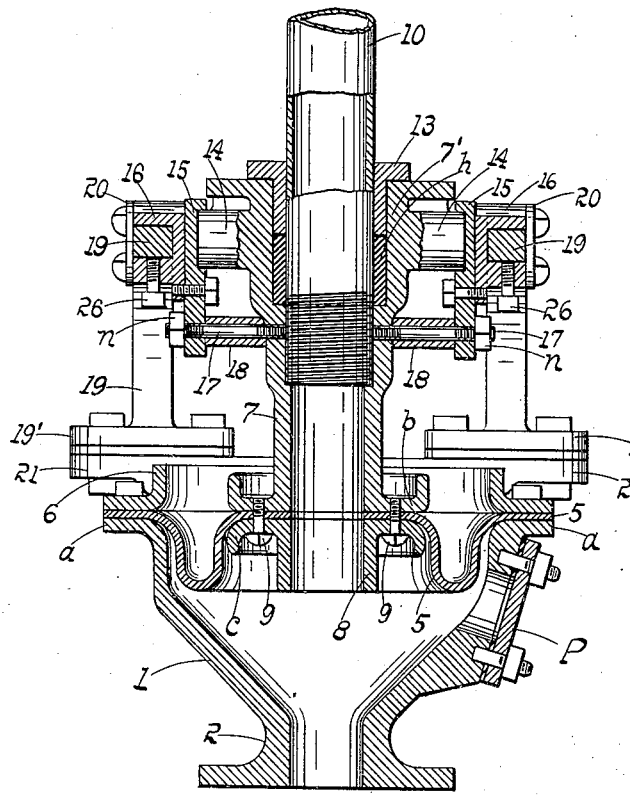

In the drawings, Figure 1 is a side elevation of the invention; Fig. 2 is an end view thereof; Fig. 3 is a horizontal section on the line 3—3 of Fig. 2; and Fig. 4 is an enlarged vertical section on the line 4—4 of Fig. 1.

The present invention, though specifically directed to pumping machines, may be used in any connection where a flexible hollow joint may subserve its legitimate function. The object here sought is to provide the intake pipe of a water, sand, mud, or other pump with a joint which will allow such pipe to assume any position both vertical and horizontal and permit a sweep to be imparted thereto in any plane for purposes of readily handling the material to be pumped, an advantage which will be more clearly apparent from a detailed description of the invention which is as follows:—

Referring to the drawings, 1 represents a casing or bowl provided with a discharge nozzle 2 to which is bolted an elbow 3 coupled to a discharge pipe 4 leading to the intake of any suitable suction pump or exhauster (not shown). Disposed about the edge of the bowl or casing 1 is a flange *a* which supports the outer portions of a flexible (preferably leather) diaphragm 5 spanning the opening of the casing, the diaphragm being firmly held in place on the flange *a* by an annular angle-ring 6, the parts being bolted together as shown. The diaphragm is provided with a central opening about which is disposed the flange *b* of a coupling tube 7 engaging the outer face of the diaphragm, the flange *c* of a ring 8 engaging the inner face, the diaphragm being firmly secured between the flanges *b*, *c*, by screws 9 whereby an air and water-tight joint is made. The medial interiorly screw-threaded portion of the coupling-tube 7 receives the screw-threaded end of the pipe 10, the latter being coupled to the dip-pipe or intake suction pipe 11 by an elbow 12, the connections being made through appropriate flanges bolted together as well understood in the art. The pipe 10 passes through the stuffing box terminal 7' of the coupling tube, a suitable packing ring *h* being interposed around the pipe in the box 7' behind the follower or gland 13 bolted to the box, as well understood in the art. By virtue of the connections as described rotation about its axis may be imparted to the pipe 10, and hence a corresponding oscillation to the pipe 11. Of course, a single rotation would simply have the effect of partially unscrewing the pipe 10, a turn in no wise affecting the tightness of the joint formed by the stuffing-box. The inner end of the pipe 10 is preferably shouldered to the base of the screw-threaded portion of the tube 7 (Fig. 4).

Disposed at points diametrically opposite one another on the peripheral walls of the stuffing-box 7' are cylindrical studs or bosses 14 which are received by suitable sockets of the brackets 15 carrying the curved sliding-pieces or slides 16. The body portion of the bracket 15 is secured to the rear wall of the slide, the bracket having an arm or portion extending beyond the slide, which portion is rigidly connected to the coupling tube 7 by means of a bolt 17, the bracket being held in position to the bolt between the terminal nut *n* and a spacing sleeve or thimble 18 interposed between the bracket arm and the tube 7 (Fig. 4). The slide 16 is a curved channel and loosely embraces a semi-circular or bowed rail 19, the flanges of the channel engaging the lower and upper faces of the rail, and the web of the channel bearing against the inner face of the rail, the outer edges of the channel being finally connected by removable plates 20 which span the outer side face of the rail. The ends of the rails 19 are secured to the ends of the rockers or oscillating levers 21, the rails terminating in feet 19' which are bolted to the levers. The levers are disposed at right angles to the planes of disposition of the rails, and are mounted on studs or pins 22 screwed into the bosses or enlargements 23 formed on the casing walls, a suitable washer 24 being interposed between the boss and lever as shown. The lever is held in position on its stud or pin 22 by a cap-plate 25, a construction well understood in the art. The casing 1 is provided with a hand-hole (or man-hole) covered by a plate P for permitting cleaning of the interior of the casing when necessary. Mechanical details and features not alluded to are well understood in practice and there is no occasion to describe them in the present connection.

The operation is obvious from the foregoing description, but may be briefly summarized as follows:—The pump being started, the suction will necessarily be through the suction pipe 11, elbow 12, pipes 10, 7, casing 1, and pipe 4, the water, mud, and other materials taking the course as mentioned, and being delivered to the pump from which it is in turn discharged where convenient. For convenience, the series of pipes 7, 10, 12, and 11 will be referred to as the suction pipe, the members 7, 10, and 12 collectively forming the goose-neck thereof. The goose-neck being coupled to a flexible diaphragm, it follows that an oscillation may be imparted to the goose-neck in two distinct intersecting planes through an angle of ninety degrees. By oscillating the gooseneck in a plane parallel to the planes of disposition of the curved rails 19, the slides 16 will ride along the rails until the member 7 is arrested by the vertical leg of the angle-ring 6, by which time the axis of the member 7 is removed forty-five degrees from the axis of the bowl or casing 1. The limits of oscillation in the plane referred to are indicated in Fig. 1 by the dotted position of the goose-neck and by the line $x$ respectively, showing that a sweep through ninety degrees is possible. This sweep may be arrested at any time by the set-screw 26 by which the slide may be clamped to the rail 19. Again, by rocking or oscillating the levers 21 about their common axis (the axis of the studs 22) in a plane at right angles to the planes of disposition of the rails 19, a similar maximum sweep of ninety degrees may be imparted to the goose-neck the vertical leg of the ring 6 arresting the member 7 with an oscillation of said member in the last mentioned plane (see lines $x$, $x$, Fig. 2). For an oscillation of the goose-neck through forty-five degrees from its central position, the pipe 11 may be made to assume a vertical position (Fig. 2) and thus dip to the bottom of a stream or body of water and suck out the material to be pumped. Again, the goose-neck being rotatable about its own axis (as previously described) it follows that the pipe 11 may be swung around three hundred and sixty degrees in a plane intersecting the previous planes through which the goose-neck may oscillate. It follows therefore, that by virtue of the flexibility of the diaphragm 5, and the rotatability of the goose-neck about its axis, every position which the suction pipe 11 may be called upon to assume in practice can be brought about. The joint therefore constitutes a valuable adjunct in connection with pumping and similar machines.

Having described my invention, what I claim is:—

1. In combination with a casing having an opening, a flexible diaphragm spanning said opening, a tubular member communicating through the center of the diaphragm with the interior of the casing, means spaced from the tubular member and securing the diaphragm to the edge of the casing about the opening whereby a maximum oscillation is permitted to the tubular member about the center of the diaphragm, rocker members disposed on opposite sides of the tubular member and oscillating in a fixed plane, arcuate rails connecting said rocker members, and means for slidably connecting the tubular member to the rails.

2. In combination with a casing open at one end and provided with discharge means, a flexible diaphragm spanning the opening and secured along the edge of the casing, a pipe connected centrally to the diaphragm and communicating therethrough with the interior of the casing, rocker members pivotally and centrally mounted at points diametrically opposite one another to the casing wall, arcuate rails connecting the adjacent ends of the rockers and bowed away from the point of discharge from the casing, and slides connected to the pipe and traversing said rails, whereby the pipe may be oscillated about its point of connection with the diaphragm in two distinct intersecting planes.

3. In combination with a casing open at one end and provided with discharge means, a flexible diaphragm spanning the opening and secured along the edge of the casing, a pipe connected centrally to the diaphragm and communicating therethrough with the interior of the casing, rocker members pivoted centrally at points diametrically opposite one another to the casing walls, arcuate rails connecting the adjacent ends of the rockers and bowed across the plane of the edge of the casing to which the diaphragm is secured, slides carried by the pipe and traversing said rails, and means for limiting the angle of oscillation of the pipe along the rails, and of the rockers about their pivots, respectively.

In testimony whereof I affix my signature, in presence of two witnesses.

PETER J. BODE.

Witnesses:
EMIL STAREK,
FANNIE E. WEBER.